(12) United States Patent
Hellmich et al.

(10) Patent No.: US 7,093,778 B1
(45) Date of Patent: Aug. 22, 2006

(54) DEVICE FOR DELIVERING AND/OR SPRAYING FLOWABLE MEDIA, ESPECIALLY FLUIDS

(75) Inventors: Wolfram Hellmich, Munich (DE); Klaus-Jürgen Peter, Isen (DE); Robert Kotter, Bruck (DE); Liang Zhang, Haar (DE)

(73) Assignee: BRP US Inc., Strurtevant, WI (US)

( * ) Notice: Subject to any disclaimer, the term of this patent is extended or adjusted under 35 U.S.C. 154(b) by 376 days.

(21) Appl. No.: 10/049,243

(22) PCT Filed: Jul. 26, 2000

(86) PCT No.: PCT/EP00/07210

§ 371 (c)(1),
(2), (4) Date: Aug. 16, 2002

(87) PCT Pub. No.: WO01/12976

PCT Pub. Date: Feb. 22, 2001

(30) Foreign Application Priority Data

Aug. 11, 1999 (DE) .......................................... 199 37 988

(51) Int. Cl.
*F02M 51/00* (2006.01)

(52) U.S. Cl. .............................. 239/585.1; 239/585.4; 335/263; 335/220; 417/418

(58) Field of Classification Search .............. 239/585.1, 239/585.4, 584; 417/418; 335/220, 263
See application file for complete search history.

(56) References Cited

U.S. PATENT DOCUMENTS

| | | | | |
|---|---|---|---|---|
| 3,791,770 A | * | 2/1974 | Farkos ......................... 417/418 |
| 4,215,820 A | * | 8/1980 | Renger ........................... 239/90 |
| 4,245,789 A | * | 1/1981 | Gray ......................... 239/585.2 |
| 4,964,571 A | * | 10/1990 | Taue et al. ..................... 239/88 |
| 5,351,893 A | * | 10/1994 | Young ....................... 239/585.1 |
| 5,890,662 A | * | 4/1999 | Dykstra .................... 239/585.1 |
| 6,078,235 A | * | 6/2000 | Schebitz et al. ............. 335/220 |
| 6,267,306 B1 | * | 7/2001 | Phillips et al. ............ 239/585.1 |
| 6,401,696 B1 | * | 6/2002 | Heimberg .................... 123/499 |
| 6,422,836 B1 | * | 7/2002 | Krueger et al. ............. 417/418 |

FOREIGN PATENT DOCUMENTS

| | | |
|---|---|---|
| DE | 41 26 124 A1 | 2/1993 |
| DE | 4126124 A1 * | 2/1993 |
| JP | 05055029 A * | 3/1993 |
| WO | WO 96/34196 | 10/1996 |

OTHER PUBLICATIONS

Search Report for International Application No. PCT/EP00/07210, dated Nov. 24, 2000.

* cited by examiner

*Primary Examiner*—David A. Scherbel
*Assistant Examiner*—James S. Hogan
(74) *Attorney, Agent, or Firm*—Osler, Hoskin & Harcourt LLP

(57) ABSTRACT

The invention concerns a device to convey and/or spray free-flowing media, in particular fluids, which works in accordance with the energy storage principle and is designed as an electromagnetically-powered reciprocating pump with at least one armature device as a drive element, whereby the armature device includes at least two armature elements and the armature elements are assigned magnetically corresponding yoke elements.

66 Claims, 3 Drawing Sheets

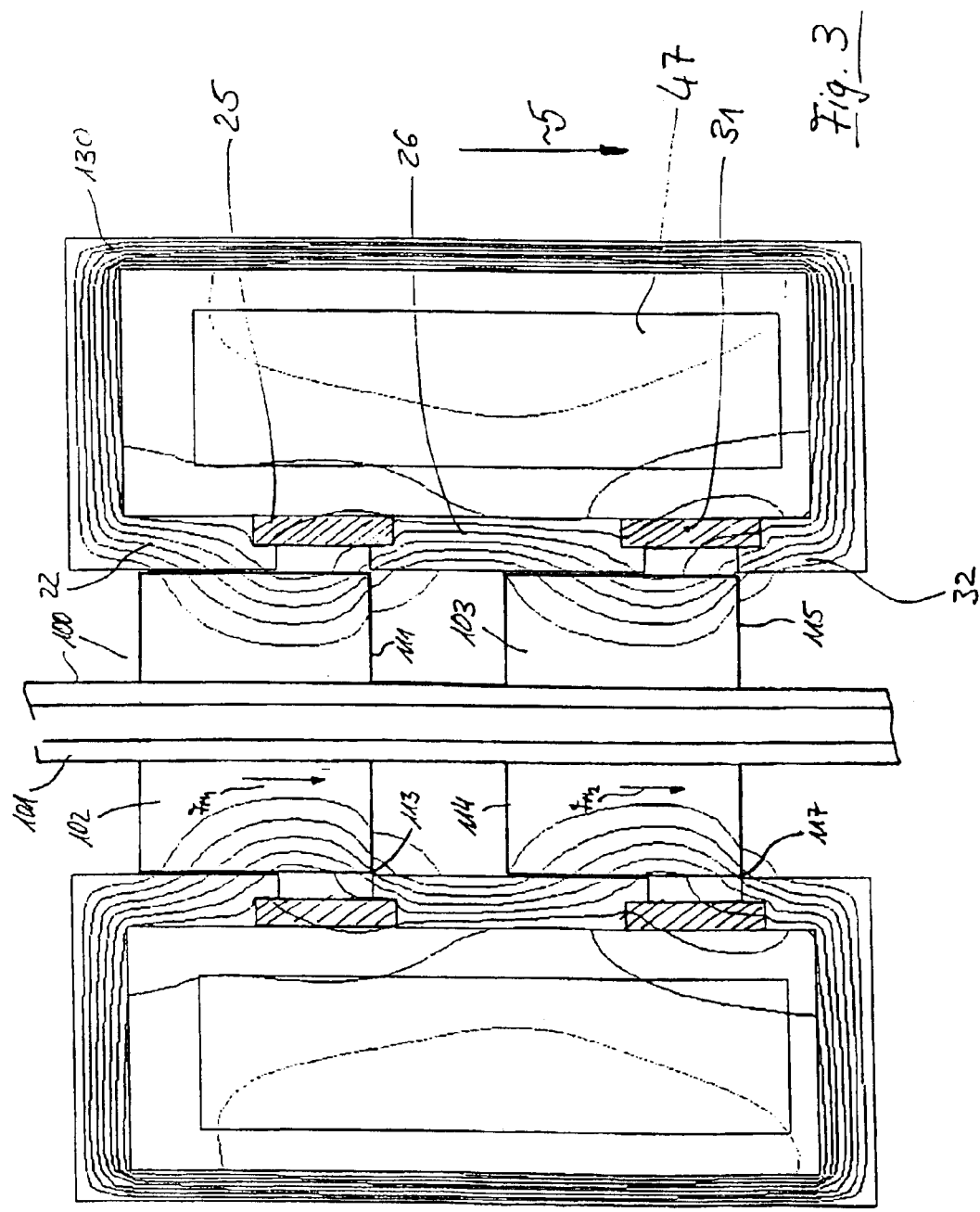

DEVICE FOR DELIVERING AND/OR SPRAYING FLOWABLE MEDIA, ESPECIALLY FLUIDS

This is a National Phase entry from PCT Patent Application Serial No. PCT/EP00/07210, filed on Jul. 26, 2000, which designated the United States. The PCT Patent Application was not published under PCT Article 21(2) in English. This application relies for priority on German Patent Application No. 199 37 988.2, filed on Aug. 11, 1999. Both applications are incorporated herein by reference.

FIELD OF THE INVENTION

The invention concerns a device to convey and/or spray free-flowing media, in particular fluids, which works in accordance with the energy storage principle and is designed as an electromagnetically powered reciprocating pump.

DESCRIPTION OF THE RELATED ART

A device of this kind is familiar for example from WO 96/34196. These injection devices work according to the solid body energy storage principle and have an armature space enclosed by an armature cylinder in which an armature device, acting as the drive device, is borne in such a manner that its can move axially. The armature cylinder is enclosed by a magnet coil which is electrically controlled and which generates the magnetic field necessary to drive the armature device. The armature cylinder encloses two axially successive armature cylinder sleeves between which there is an annular element made of a magnetic nonconductor. The armature device has an axially movable delivery plunger tube and an armature element fastened on this. The armature element sits in the armature cylinder with radial play. The clearance represents a magnetic resistance that weakens the magnetic flux and is referred to as a so-called parasitic gap.

The armature device absorbs kinetic energy in operation during an almost resistanceless acceleration phase, whereby the resistanceless acceleration phase is generated by a valve that closes a pressure space so that the fluid contained in the pressure space that is to be sprayed experiences a pressure impact that spreads through the pressure space in the form of a pressure wave. The pressure wave effects an opening of a spring-loaded injection nozzle element that closes the other end of the pressure space so that the fluid in the pressure space is sprayed out.

After the injection nozzle element has opened and the fluid has been sprayed out due to the pressure impact, the armature device, and in particular its delivery plunger tube, is moved further in the pressure space thus leading to a continuation of the spraying process in the form of a displacement spraying. The return stroke of the armature device is effected by a pressure spring.

Such fluid injection devices have proven their worth, for example as fuel injection devices for internal combustion engines, in particular for two-stroke internal combustion engines.

SUMMARY OF THE INVENTION

The development trends in the field of modern internal combustion engines, in particular modern two-stroke internal combustion engines for recreational sports equipment such as personal water craft or snowmobiles, are towards larger cylinder piston capacities with constant or even higher nominal speeds and a simultaneous reduction of the number of cylinders in the internal combustion engine for cost and weight reasons.

This results in increasing demands on the injection systems of these internal combustion engines with respect to the flow rates per working cycle and with respect to the volume flow (i.e., fluid flow rate per unit of time).

This increased flow rate per working cycle and the increased volume flow can be achieved, for example, by enlarging the electromagnets, though these then also have a higher electrical power consumption. But this entails additional costs not only for the larger elements but also, and above all, for generators and control circuits for the electromagnets that are more powerful.

The task of the invention is to produce a device to convey and/or spray free-flowing media, in particular fluids, that guarantees a higher flow rate per working cycle and a higher volume flow of the sprayed or conveyed fluid at a certain or given electrical energy supply and in particular a certain or given structural size, in other words is improved with respect to the efficiency.

It is, therefore, one aspect of the invention to provide a device that resolves the deficiencies in the art.

The terms "armature" and "yoke" will be used in the following to define the two elements that are moveable in relation to each other and between which a magnetic force is effective, whereby the "yoke" is the stationary of the two moving elements and the "armature" refers to the element that moves due to the magnetic force relative to the "yoke".

The working gap plane is an imaginary plane resulting from a radial projection of an axial gap (working gaps) between an "armature" and a corresponding "yoke" on a pre-defined diameter.

A "conducting element" in the following is understood to be an element that serves the specific transmission or guidance of the magnetic flux.

In accordance with the invention, a device to convey and/or spray free-flowing media, in particular fluids is planned that works in accordance with the energy storage principle and is designed as an electromagnetically powered reciprocating pump with at least one armature device as a drive element and where the armature device has at least two armature elements and the armature elements are assigned to magnetically corresponding yoke elements.

Within the scope of the invention, the effect is exploited whereby an enlargement of the working gap plane between one armature and its magnetically corresponding yoke means that a greater amount of energy can be transmitted from the magnetic field provided by a coil to the armature device.

In accordance with the invention, an enlargement of the working gap plane is achieved by a very simple method, whereby a magnetic series connection of at least two armature elements together with their respective corresponding yoke elements is planned. Accordingly, an armature device is to be provided, for example, that bears a multiple of, i.e. at least two, axially spaced armature elements on an armature carrier, e.g. a delivery plunger tube.

Two stationary yoke elements are provided each of which correspond magnetically to the armature elements of the armature devices and which form a magnetic antipole for the armature elements. For example, an armature cylinder surrounding the armature device has corresponding armature cylinder sleeves as yoke elements which are separated from one another by magnetically nonconducting annular elements.

A preferred variant of the armature device is designed as a two-armature element device and is surrounded by an armature cylinder with two corresponding yoke elements, e.g., armature cylinder sleeves.

A particularly preferred variant of the device, in accordance with the invention, works according to the solid body energy storage principle.

With a device to convey and/or spray free-flowing media, in particular fluids, in accordance with the invention, it is advantageous that, with a given electrical energy supply, the static magnetic force on the armature device is much higher than the state-of-the-art and, thus, the work performed by the armature device along its stroke path is much greater. In this respect, the energy transmitted by the armature device to the medium to be conveyed or sprayed and, thus, the efficiency of the device in accordance with the invention, is significantly increased. A device in accordance with the invention requires only a small structural space on account of the axially serial arrangement of the armature elements in a magnetic serial connection.

The increased energy input in the medium to be conveyed or sprayed can be used depending on the geometric design of the pump device in the form of a higher flow rate per working cycle or a higher volume flow and/or a higher pressure in the medium to be conveyed or sprayed. This can be pre-determined, for example through the choice of a certain diameter of the pump equipment that pumps the media, e.g. the delivery plunger tube.

BRIEF DESCRIPTION OF THE DRAWINGS

The invention will be exemplarily described in detail in the following on the basis of the drawings. These show:

FIG. 3 is a diagrammatic view of the flux distribution characteristics of the magnetic lines of force of the device illustrated in FIG. 1.

DESCRIPTION OF PREFERRED EMBODIMENT(S) OF THE INVENTION

Figure 1:
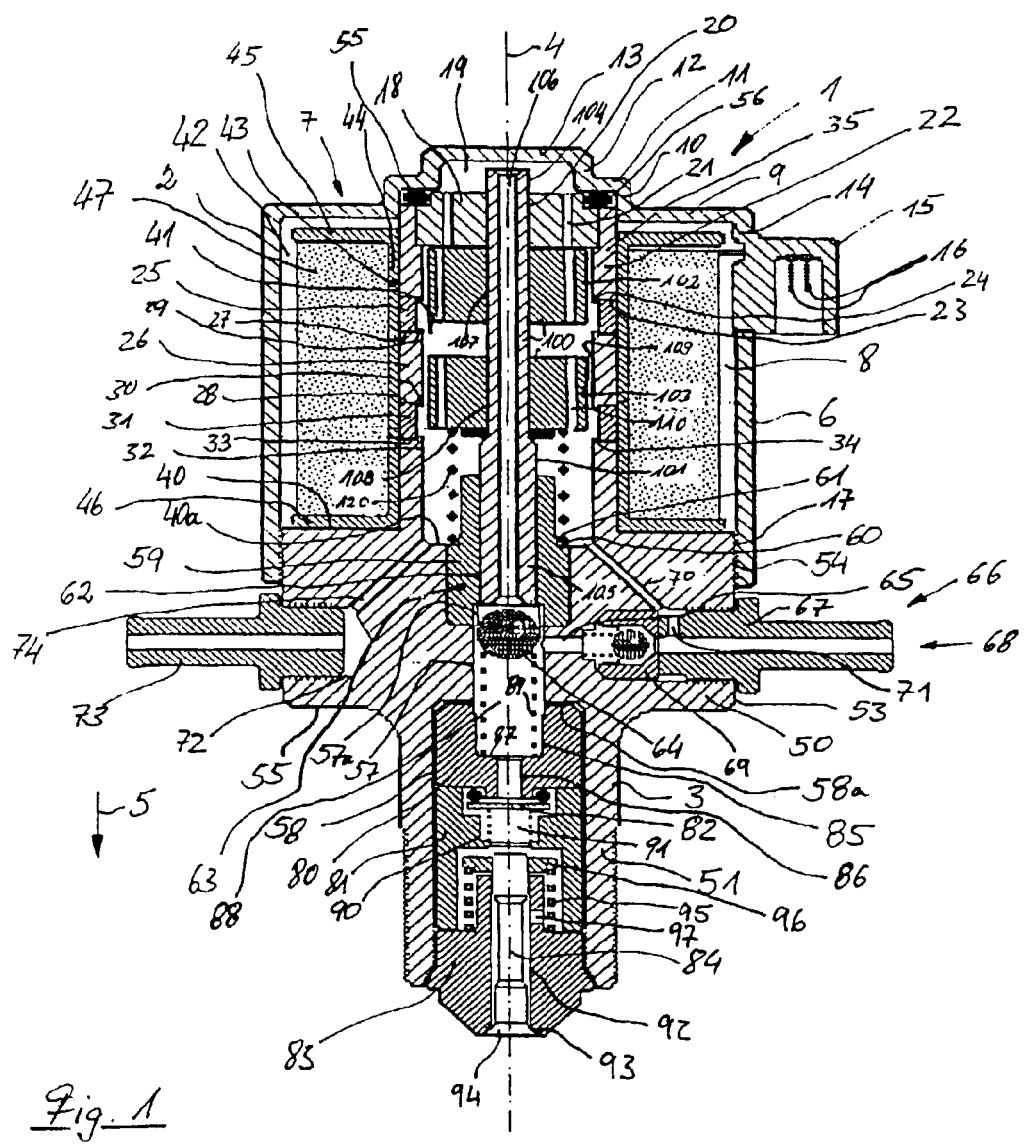
FIG. 1 is a longitudinal section through a device in accordance with the invention to convey and/or spray free-flowing media, in particular fluids.

The preferred variant of the device 1 in accordance with the invention shown works in accordance with the solid body energy storage principle and shows a pot-shaped drive housing 2 and a pump housing 3 that closes an open end of the pot-shaped drive housing 2. The drive housing 2 and the pump housing 3 are essentially rotationally symmetrical bodies and have a common central longitudinal axis 4. The pump housing 3 is arranged upstream from the drive housing 2 in a direction of delivery 5 of the medium to be conveyed or sprayed.

The drive housing 2 has a thin-walled, cylinder jacket-shaped outside wall 6 and a thin-walled base wall 7 that closes one end of the drive housing 2 so that a drive housing inner space 8 is limited. The base wall 7 has two steps radial to the central longitudinal axis 4. The base wall 7 has a first annular face wall 9 running radially from the outside to the inside, a first annular stepped wall 10 running coaxially to the outside wall 6, a second annular face wall 11 running opposite to the direction of delivery 5 and set back from the first annular face wall 9, a second annular face wall 12, and a rear final wall 13 axial to the direction of delivery 5. The outside wall 6 includes a recess 14 near the first annular face wall 9 containing a connecting device 15 with contact elements 16 to connect the device 1 to an electricity supply. In the front, open end of the drive housing 2, in the direction of delivery 5, there is a thread 17 on the inner side of the outside wall.

An essentially cylindrically disk-shaped guide piece 18 sits in the radial inner partial area of the inner side of the second annular face wall 11, so that a base cavity 19 is bordered by the guide piece 18, the second annular face wall 12 and the final wall 13. The guide piece 18 has a central bearing bore 20 with the central longitudinal axis 4 as the bore axis. A number of through bores 21 are arranged radially around the bearing bore 20, parallel to the bearing bore 20, which run into the base cavity 19 on the base side.

A first cylindrical tube-shaped armature cylinder sleeve 22 that protrudes slightly into the drive housing inner space 8 away from the base wall 7, with the central longitudinal axis 4 as a center axis, sits as a conducting element radially positioned between the guide piece 18 and the first annular stepped wall 10 and axially positioned on the guide piece 18. The first armature cylinder sleeve 22 is made of a very good magnetically conductive material and displays a face 23 on the inner space side from which a small piston land 24 protrudes axially in the direction of delivery 5.

A first cylindrical ring-shaped annular element 25 sits axially on the face 23 of the first armature cylinder sleeve 22 as a spacing element or means to interrupt the magnetic flux and is positively held radially by the piston land 24. The annular element 25 consists of a magnetic nonconductor, e.g. stainless steel. A cylindrical ring-shaped second armature cylinder sleeve 26 follows axially on the first annular element 25 as the first yoke element and bears an axially protruding piston land 29 and 30 on the inside radius of its base-side face 27 and its pump housing-side face 28.

Analogous to the first annular element 25, a second annular element 31, which has the same three-dimensional shape as the first annular element 25 and is also made of a magnetic nonconducting, non-magnetizable material, e.g. stainless steel, sits on the face 28 of the second armature cylinder sleeve 26 as a spacing element or means to interrupt the magnetic flux.

A third armature cylinder sleeve 32 follows axially on the second annular element 31 as the second yoke element which has a face 33 on its base-side end and, analogous to the second armature cylinder sleeve 26, a piston land 34. This sits axially on one end of the second annular element 31 and sits as one piece on the other end in the form of a piston land on the base-side face 40 of the pump housing.

The third armature cylinder sleeve 32 encloses a radial inner ring area 40a of the base-side face 40 of the pump housing 3.

The armature cylinder sleeves 22, 26, 32 and the annular elements 25, 31 form an armature cylinder 35 with the central longitudinal axis 4 as the central axis, which circumscribes an armature space 41. The armature space 41 is limited on the base wall side by the guide piece 18 and on the pump housing side by the inner ring area 40a of the face 40 of the pump housing 3.

The radial outer surfaces of the armature cylinder sleeves 22, 26, 32 and the annular elements 25, 31 are axially aligned to each other to form a cylindrical armature cylinder outer surface.

The annular elements 25, 31 have slightly thinner walls than the armature cylinder sleeves 22, 26, 32 so that their inner surfaces have a greater radial gap to the central longitudinal axis 4 compared to the axially aligned inner surfaces of the armature cylinder sleeves 22, 26, 32.

The outer surface of the armature cylinder 35 and the outer wall 6 of the drive housing 2 delimit a cylindrical ring-shaped coil space 42. A cable drum-shaped coil frame 43 with a cylindrical tube-shaped, carrier base tube wall 44, a boundary piston land 45 protruding radially from one end on the base side and a boundary piston land 46 on the pump housing side, sits in the coil space 42 surrounding the outside of the armature cylinder 35. The boundary piston lands 45, 46 protrude radially up to shortly before the outer wall 6 of the drive housing 2.

The coil frame 43 extends from the base face 40 of the pump housing 3 to shortly before the first annular face wall 9 of the drive housing 2.

In the space delimited by the walls, 44, 45, 46, there is a magnet coil 47 connected to the contact elements 16 of the connecting device 15.

Pump housing 3 is essentially a rotationally symmetrical body around the central longitudinal axis 4 with a base part 50 and a nozzle-retaining cylinder 51 shaped as one piece on the base part 50 and protruding axially from this in the direction of delivery 5.

The base part 50 is cylindrical disk-shaped and delimited on the base side by the face 40 and the inner area 40a of the face 40 and on the opposite side by a face 55. The base part 50 has a circumferential surface 53 whose base-side end area has a male thread 54 corresponding to the female thread 17 of the drive housing 2. The base part 50 is screwed into the drive housing 2 so far that the armature cylinder sleeves 22, 26, 32 and the annular elements 25, 31 are pressed axially against one another, and this is supported by the guide piece 18 on the second annular ring wall 11. A sealing ring 55, e.g. an O-ring, is provided to seal off the base cavity 19 and the armature space 41 from the coil space 42, which sits in a sealing channel 56 formed by a base-side face of the first armature cylinder sleeve 32, the first annular ring wall 10, the second annular ring wall 11 and an L-shaped recess in the guide piece 18.

The base part 50 has a simple stepped through bore 57 with the central longitudinal axis 4 as the central axis. The stepped-through bore 57 is enlarged on the base side at a location hole 57a, which ends in the armature space 41. At the other end, the stepped-through bore 57 is enlarged by a blind hole bore 58 delimited by the nozzle retaining cylinder 51. It is enlarged compared to the stepped through bore 57.

In the enlargement of the stepped through bore 57 on the armature space side, there is a positive and non-positive-locked guide cylinder 59 tapered in two steps. The guide cylinder 59 protrudes into the armature space 41 on a level with the inner area 40a forming an annular face 60 and an annular projection 61.

The guide cylinder 59 displays a stepped through bore 62 corresponding to the bearing bore 20 that has the central longitudinal axis 4 as a central axis. In other words, the guide cylinder 59 is axially aligned with the bearing bore 20 of the guide piece 18. The through bore 62 is enlarged to the diameter of the through bore 57 at its armature space 41 end. Around the inner circumference of the enlarged area of the through bore 62 there are a number of spaced positioning ribs 63 for a valve body 64 that point radially inwards. The valve body 64 rests in the through bore 57 with play, so that the areas in front of and behind the valve body 64 are hydraulically connected.

A multiple, tapering, feed bore 65 for the medium to be conveyed or sprayed leads radially from the outer surface 53 of the pump housing 3 and ends in the through bore 57. There is a feed device 66 in the feed bore 65 consisting of a hollow drilled feed nipple 67 and a return valve element 69 positioned radially inwards after this in the feed direction 68 that prevents the medium from flowing opposite to the feed direction 68.

A first flood bore 70 branches diagonally from the feed bore 65 radially outside the return valve element 68 that ends in the armature space 41 and is connected to the central bore of the feed nipple 67 via a cross bore 71. Opposite to the feed bore 65 there is a radial, blind hole-shaped drain bore 72 in the pump housing 3 in which a drain nipple 73 sits as a drain device. A second flood bore 74 branches diagonally from the base of the drain bore 72 that also ends in the armature space 41.

In the blind-hole bore 58 of the nozzle retaining cylinder 51 there are, in the following order, a pressure space end piece 80, a carrier piece 81 for a stationary pressure valve 82 and a spray nozzle element 83 with a spring-loaded injector needle 84 axial to the direction of delivery 5.

The pressure space end piece 80 sits radially positive in the blind hole bore 58 and axially on its base-side bore bottom 58a and has a pressure space bore 85 coaxial to the through bore 57 that tapers in one stage in the direction of delivery 5 to an overflow bore 86 to form an annular face 87.

The pressure space bore 85 and the through bore 87 delimit a pressure space 88 that is sealed on the drive side by the spherical valve body 64 and ends on the nozzle side in the overflow bore 86.

The valve body 64 lies on the radial inner edge of the ribs 63 in its starting position, spring-loaded by a pressure spring 89, whereby one end of the pressure spring 89 rests on the valve body 64 and the other end on the annular face 87 of the guide cylinder 59.

The carrier piece 81 is placed axially against the pressure space end piece 80 and also has a multiple stepped through bore 90 that initially tapers in the direction of delivery 5 and then enlarges to form a pressure retention chamber 91 in which the stationary pressure valve 82 is located on the pressure space side. The stationary pressure valve 82 guarantees a certain minimum pressure in the medium in the pressure-retaining chamber 91 and opens in the direction of delivery 5 as soon as a pressure higher than the standard pressure prevails in the pressure space 88.

The injector nozzle element 83 is placed against the carrier piece 81 axial to the direction of delivery 5. The injector nozzle element 83 has an axial through bore 92 in which the injector needle 84 is borne so that it can move axially. The through bore 92 has a conically enlarged sealing face 93 on the nozzle end side that is sealed off by a valve disk 94 on the nozzle end side connected as one piece to a shaft of the injector needle 84. The injector needle 84 sits pre-stressed in a known manner against the direction of delivery 5 by a pressure spring 95 and a needle disk 96 in the through bore 92, whereby the tapered end of the nozzle element 83 on the pressure space side, the pressure spring 95 and a part of the injector needle shaft protrude into the nozzle side enlargement of the through bore 90 of the carrier piece 81. The enlargement of the through bore 90 on the nozzle side is connected to the through bore 92 via an overflow bore 97.

The device 1 has a standard armature device 100 as a drive element that comprises an armature carrier element 101, e.g. a delivery plunger tube, and a first armature element 102 on the base side. The standard armature device 100 also comprises a second, identical armature element 103 on the pressure space side, positioned at a distance D (FIG. 2) from the first armature element 102.

There is a pressure spring 120 between the second armature element 103 and the annular face 60 of the guide cylinder 59 that presses the armature device 100 axially in the starting position against the direction of delivery 5 so that the first armature element 102 rests against the guide piece 18.

The armature carrier element 101 is designed, e.g. as a delivery plunger tube, which is essentially a hollow cylindrical, long stretched-out body that can be moved axially. The armature carrier element 101 is locked positively in a radial direction with its base end 104 in the bearing bore 20 of the guide piece 18, passing through the armature space 41, and with its pressure space-side end 105 in the bearing bore 62 of the guide cylinder 59. In the starting position, the end 104 protrudes slightly into the base cavity 19, whereby the end 105 is roughly flush with the pressure space-side end of the bearing bore 62 of the guide cylinder 59. The end 105 is located at a slight distance from the valve body 64, which rests on the ribs 63. The armature carrier element 101 has an axial through bore 106 the ends of which are conically enlarged in the manner of a phase. The chamfer of the armature carrier element 101 on the pressure space side forms a valve seat for the valve body 64 so that the armature carrier element 101 and the valve body 64 form a valve with which the armature space 41 can be hydraulically separated from the pressure space 88.

Figure 2:
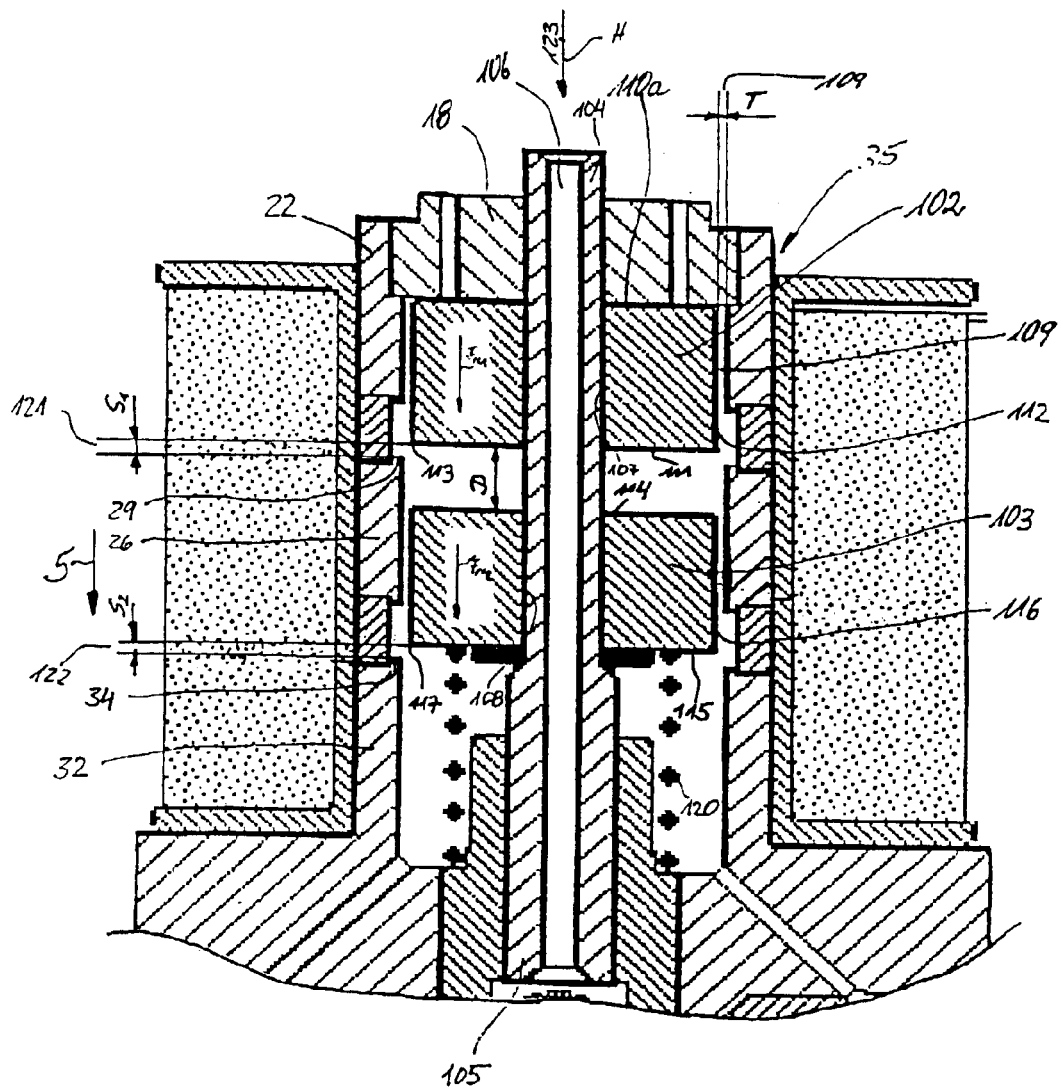
FIG. 2 is a detailed view of the longitudinal section of the device illustrated in FIG. 1.

Referring to FIG. 2, the armature elements 102, 103 are located in the armature space and each are essentially, cylindrically ring disk-shaped. Each has a central bore 107 and 108, which have the central longitudinal axis 4 as their central axis. The armature elements 102, 103 sit firmly with the bore 107, 108 on the armature carrier element 101 and have an outer diameter that is slightly smaller than the inner diameter of the armature cylinder sleeves 22, 26, 32, thus forming a radial play gap 109 of the width T. The armature elements 102, 103 thus rest in the armature space 41 with a radial play to the armature cylinder 35 and can be moved in an axial direction. The armature elements 102, 103 are made of a lightweight, magnetizable material and each has at least one overflow bore 110 parallel to the central bores 107, 108.

The armature element 102 has a face 110a on the base side and face 111 on the pressure space side. The armature element 102 also has a circumferential face 112. The face 111 and the circumferential face 112 form a circumferential edge 113 (see, e.g., FIG. 2). The armature element 103 accordingly has a face 114 on the base side and a face 115 on the pressure space side. It also has a circumferential face 116. The face 115 and the circumferential face 116 form a circumferential edge 117.

As described above, the face 110 of the first armature element 102 rests on the guide piece 18 on the armature space side in the starting position. The axial longitudinal extension of the armature element 102 is constructed so that it covers the part of the armature cylinder sleeve 22 that delimits the armature space 41 in the axial direction and so that there is a first axial gap 121 with a gap width $S_1$ between its circumferential edge 113 and the piston land 29 of the second armature cylinder sleeve 26.

The second armature element 103 is positioned accordingly at the distance D from the first armature element 102 and in front of this in the direction of delivery 5, whereby it covers the inner surface of the second armature cylinder sleeve 26 roughly over the same axial length, analogous to the first armature element 102. The axial longitudinal extension of the armature element 103 is conceived analogous to the armature element 102 so that there is a second axial gap 122 with the gap width $S_2$ between its circumferential edge 117 and the piston land 34 of the third armature cylinder sleeve.

The axial overlap of the armature elements 102, 103 (and the corresponding adjacent armature cylinder sleeves 22 and 26 in the starting position and the respective adjacent annular elements 25 and 31 in the starting position) has been chosen so that the magnetic flux is optimized.

The gap widths $S_1$, $S_2$ are advantageously smaller than the longitudinal extension, in particular smaller than half the longitudinal extension of the annular elements 25, 31.

Each of the armature cylinder sleeves 26, 32 forms a stationary yoke element compared to the axially movable armature elements 102, 103, i.e. the stationary magnetic counterpart to the armature elements 102, 103. The armature cylinder sleeves 22 and 26 form conducting elements for the magnetic flux for the adjacent armature elements 102 and 103 in the starting position.

If the coil 47 is supplied with current in the starting position as shown in FIG. 2, magnetic lines of force 130 form toroidally around the coil body (FIG. 3). Depending on the polarity, they enter the first armature cylinder sleeve 22, e.g. from the base side, the armature element 102 thus bridging the radial gap 18 (the parasitic gap between the armature cylinder sleeve 22 and the first armature element 102). The magnetic lines of force 130 leave the armature element 102 to a large extent in the area of the narrowest point between the armature element 102 and the second armature cylinder sleeve 26 (yoke element). The magnetic lines of force 130 run roughly axially in the second armature cylinder sleeve 26 up to the overlap area of the second armature element 103 and the second armature cylinder sleeve 26. The magnetic lines of force 130 enter the second armature element 103 by bridging the gap 108 (parasitic gap) between the armature cylinder sleeve 26 and the second armature element 103. The magnetic lines of face 130 leave the second armature element 103 in a manner analogous to the first armature element 102 to a large extent at the narrowest point between the second armature element 103 and the third armature cylinder sleeve 32. Finally, the magnetic lines of force 130 enter the third armature cylinder sleeve 32 (see FIG. 3).

As a result of this, the areas of the armature elements 102 and 103 (faces 111 and 115) and the armature cylinder sleeves 26 and 32 (piston lands 29 and 34) opposite the abovementioned narrow points are magnetized with opposite poles so that static magnetic forces $F_{M1}$ and $F_{M2}$ work on the armature element 102 and the armature element 103. The armature elements 102, 103 thus represent armatures (in the sense of the above-mentioned definition) and the armature cylinder sleeve 26, 32 yoke elements (in the sense of the abovementioned definition).

The total static magnetic force $F_M = F_{M1} + F_{M2}$ that works on the armature device 100 is much higher with the same input of electrical energy, due to the abovementioned magnetic series connection of the armature elements 102, 103 and the corresponding yoke elements 25, 32 than a resulting magnetic force with an armature device that has a single armature element only. Thus, the output of the armature device 100 over a certain distance H along a direction of stroke 123 is correspondingly higher. In this respect, this leads to a better use of the magnetic energy generated by the coil 47 by means of a pre-defined input energy. Thus, the efficiency of a drive device of this type, with a multiple armature device 100 with armature elements 102 and 103 yoke elements corresponding to the armature elements 102 and 103, and thus the overall efficiency of a device 1 in accordance with the invention, is significantly improved.

It was seen that with two armature and yoke elements arranged typically for the design in such a device 1, the static magnetic force $F_M$ could be increased in the most unfavorable case by at least 60% compared to the state-of-the-art with no additional input of electrical energy.

The gaps 121 and 122 extend in the working direction (direction of stroke 123) of the armature device 100. The widths $S_1$ and $S_2$ of these gaps determine the amount of the static magnetic forces that momentarily occur between the armature elements 102, 103 and the yoke elements (armature cylinder sleeves 26, 32) that operate along the path H of the armature device 100. In this respect, they represent working gaps. The radial projection of the working gaps 121, 122 on the fixed radius, e.g. the radius of the inner surface of the armature cylinder sleeves 26, 22, 32, produces a working gap plane whose size depends on this radius and the corresponding gap widths $S_1$, $S_2$. With the given currently prevailing gap width $S_1$, $S_2$ of a working gap produced by a movement of the armature device 100, the size of the working gap is decisive for the magnetic force active between the yoke element ad the armature element. The gap 109 extends with a width T vertical to the working direction (direction of stroke 123) of the armature device 100. No magnetic forces that perform work occur. Thus, these gaps 108 represent undesired "magnetic resistances" and are referred to as so-called "parasitic gaps". A minimization of the width T of these parasitic gaps 109 is desirable but limits are set by unavoidable production engineering tolerances.

The bigger the working gap plane at a given gap width $S_1$, $S_2$ of the working gap, the bigger the effective magnetic forces $F_{M1}$ and $F_{M2}$ on the armature elements 102, 103 at a given magnetic field strength.

Within the scope of the invention, the working gap plane was enlarged by a magnetic series connection of at least two armature-yoke arrangement so that at least two working gaps 121, 122 are formed.

In addition, the momentary magnetic force on an armature element 102, 103 of an armature-yoke arrangement (102, 26; 103, 34) depends on the width S of the momentary working gap 121, 122, so that the stroke path H can change the static magnetic forces on the armature elements 102, 103.

At a starting gap width $S_1$, $S_2$ the magnetic forces assume a certain value as described above. This value increases with a decreasing gap width S and reaches a maximum value at S=0, which then drops again at S<0, corresponding to an axial overlap between the armature and corresponding yoke element.

In this respect, the force curve of the overall force $F_M$ can be altered over the stroke path H of the armature device 100 through the choice of working gap widths $S_1$, $S_2$. Thus, it is easy to influence, in the manner described below, the spray characteristics, the pressure characteristic, the maximum injection volume flow or similar characteristics of the device 1, for example. It is of course within the scope of the invention to make the working gap widths $S_1$ and $S_2$ identical or, alternatively, of different sizes. Moreover, the armature elements 102, 103 can be arranged at various positions adjustable in an axial direction on the armature carrier element 101.

In this respect, a device 1 in accordance with the invention enables not only drastically higher energy utilization of the input electrical energy by simple means, but also an increased variability of the device 1 with respect to various characteristic parameters of a generic device.

The mode of operation of the device to convey and/or spray free-flowing media, in particular fluids, in accordance with the invention will be explained in more detail below.

In an initial state, the coil 47 is currentless, the armature device 100 is in its starting position on the base side and the valve body 64 rests on the ribs 57a. There is a gap between the armature carrier element 101 and the valve body 64. The media to be conveyed or sprayed is fed in through the feed device 66, preferably at an admission pressure, and enters the armature space 41 and base cavity 19 as well as the though bore 106 via the cross bore 71, the flood bore 70 and the bores 110 and 21. Excess media escapes through the bore 74 and drain device 73 so that the armature space 41 can be rinsed through with fresh medium. At the same time, fresh medium enters the pressure space 88 up to the stationary pressure valve 82 via the return valve 69 and the feed bore. Excess medium in the pressure space 88 passes the valve body 64 via the through bore 106 in the base cavity 19 and via the bores 21 into the armature space 41. Thus, the pressure space 88 can also be rinsed through with fresh medium when the valve, consisting of the valve body 64 and the delivery tube plunger 101, is open. Medium is present at stationary pressure between the stationary pressure valve 82 and the nozzle mouth.

If current is applied to the coil 47, a force $F_M$ becomes effective on the armature device 100 that accelerates the armature device 100 with almost no resistance in the direction of delivery 5, whereby this stores kinetic energy. After a certain distance, the pressure space end 105 of the armature device 100 strikes against the valve body 64. When the armature device 100 hits the valve body 64 the pressure space 88 is hydraulically separated from the armature space 41 and the kinetic energy stored in the armature device 100 is transferred to the medium in the pressure space 88 in front of the armature carrier element 101 in the form of a pressure impact.

The pressure impact spreads through the medium and reaches the nozzle outlet by overcoming the stationary pressure valve 82.

The return valve 69 prevents the pressure impact from escaping in the feed direction 66. The injector needle 84 of the spray nozzle element 83 opens when a pre-definable injection pressure is exceeded.

Depending on the ON duration of the coil current (the duration of energization of the coil 47), the pressure impact conveying or spraying of the medium is followed by a displacement conveying or spraying of the medium when the armature device 100, in particular the armature carrier element 101, is moved further in the direction of delivery 5 in the pressure space 88.

If the coil current is switched off, the armature device 100 and the valve body 64 are returned to their starting positions by their pressure springs 120 and 89. The amount of medium that has been sprayed is fed into the pressure space 88 by the feed device 66 at an admission pressure.

In accordance with further embodiments, the flow paths for the medium to be conveyed or sprayed, and the valve devices, are adjusted for conveying or spraying free-flowing media, e.g. dusty, granular, granulated or powdered media or fluids mixed with solids, e.g. sludges.

If a device 1 in accordance with the invention is to be used for intermittent conveying only, the spray nozzle device 83 can of course be omitted or replaced as necessary by a return valve device, e.g. similar to the stationary pressure valve 82.

In accordance with a further embodiment, each armature-yoke arrangement is assigned a separate drive magnet coil, each of which can also be electrically controlled separately as necessary. For practical purposes, the axial gap between the coils corresponds to that between the armature cylinder sleeves.

For a further optimization of the efficiency, the armature carrier element 101 in the area of the armature elements 102, 103 can be made of a magnetic nonconductor, e.g. stainless steel to reduce the magnetic losses and at the end on the pressure space side of an impact-proof material. This prevents an unwanted course of the magnetic lines of force 130 over the armature carrier element.

Naturally, the scope of the invention also includes a device to convey and/or spray free-flowing media that works according to the energy storage principle with resistanceless accelerated and abruptly braked media, and that has a drive device with a multiple armature-yoke arrangement.)

In accordance with a further embodiment, a device 1 in accordance with the invention is designed as a double action device to convey and/or spray free-flowing media, in particular fluids, with reference to WO 96/34195.

Naturally, the annular elements 25, 31 of magnetically nonconducting material can also be designed as air gaps. It is also within the scope of the invention, for example, to design the carrier base tube wall 44 of the coil frame as an armature cylinder from a succession of magnetically conducting and magnetically nonconducting sleeve or annular elements.

What is claimed is:

1. A device to deliver a free-flowing medium, comprising:
   a drive housing defining a delivery direction of the free-flowing medium;

a magnet coil disposed within the drive housing, the magnetic coil being constructed to generate a magnetic flux in an energized state;

an axially movable armature device disposed within the magnet coil, the axially movable armature device comprising at least first and second armature elements, the armature elements being disposed a predetermined distance from one another in the delivery direction, the armature elements defining first and second faces; and an armature cylinder disposed within the magnet coil adjacent to the armature elements, the armature cylinder comprising at least first and second elements constructed to interrupt the magnetic flux, wherein the first and second flux-interrupting elements are disposed adjacent to first and second lands, and wherein the first and second lands are disposed first and second predetermined distances from the first and second faces of the armature elements to establish first and second gaps that interrupt magnetic flux, thereby establishing the magnetic flux at least within the armature cylinder, the armature elements, and the drive housing.

2. The device of claim 1, wherein the armature cylinder comprises, in the delivery direction:
a first armature cylinder sleeve;
the first flux-interrupting element;
a second armature cylinder sleeve;
the second flux-interrupting element; and
a third armature cylinder sleeve,
wherein the first and second flux-interrupting elements are annular.

3. The device of claim 1, wherein:
the first and second predetermined distances establishing the first and second gaps are identical.

4. The device of claim 1, wherein:
the first and second predetermined distances establishing the first and second gaps differ from one another.

5. The device of claim 1, wherein:
at least one of the first and second predetermined distances establishing the first and second gaps is zero when the magnet coil is in an de-energized state.

6. The device of claim 1, wherein:
the first and second armature elements are affixed to an armature carrier element.

7. The device of claim 6, wherein:
the first and second armature elements are immovably affixed to the armature carrier element at the predetermined distance from one another.

8. The device of claim 6, wherein:
the first and second armature elements are movably affixed to the armature carrier element so that the predetermined distance therebetween is adjustable.

9. The device of claim 6, wherein:
the first and second armature elements are ring-shaped and define central bores therein through which the armature carrier element is disposed, and the first and second armature elements extend first and second predetermined extension distances in the delivery direction such that the first and second armature elements, in a de-energized state of the magnet coil, are at least partially coextensive with portions of the armature cylinder and the first and second elements constructed to interrupt the magnetic flux, thereby permitting the magnetic flux to be conducted from the armature cylinder to the first and second armature elements.

10. The device of claim 9, wherein the first and second armature elements are cylindrical.

11. The device of claim 9, wherein:
the first and second predetermined distances establishing the first and second gaps are at least one half of the first and second predetermined extension distances.

12. The device of claim 2, wherein:
the first and second armature elements have first and second outer diameters, the first, second and third armature cylinder sleeves have first, second and third inner diameters, and the first and second outer diameters are less than the first, second and third inner diameters to form a radial gap between the first and second armature elements and the first, second, and third, armature cylinder sleeves.

13. The device of claim 12, wherein:
the first and second armature element outer diameters are equal to one another, and the first, second, and third armature cylinder sleeve inner diameters are equal to one another.

14. The device of claim 2, wherein:
the first and second armature elements and the first, second, and third armature cylinder sleeves are magnetizable.

15. The device of claim 14, wherein the first and second armature elements are made of a magnetically-conductive material.

16. The device of claim 1, wherein:
the first and second armature elements each define at least one overflow bore therethrough.

17. The device of claim 16, wherein:
the overflow bores are disposed parallel to the central bores of the first and second armature elements.

18. The device of claim 1, wherein:
the first and second elements constructed to interrupt the magnetic flux are made of a material capable of conducting no more than a fraction of the magnetic flux.

19. The device of claim 1, wherein:
the first and second elements constructed to interrupt the magnetic flux are made of a material incapable of conducting the magnetic flux.

20. The device of claim 1, wherein:
the first and second elements constructed to interrupt the magnetic flux are made of a non-magnetizable material.

21. The device of claim 1, wherein:
the magnet coil comprises a plurality of magnet coils disposed axially adjacent to one another.

22. The device of claim 21, wherein:
the plurality of magnet coils comprises a number corresponding to an armature-yoke arrangement.

23. The device of claim 21, wherein:
each of the plurality of magnet coils is separately energizable.

24. The device of claim 21, wherein:
the plurality of magnet coils are disposed from one another by a predetermined magnet distance equal to the predetermined distance between the first and second armature elements.

25. The device of claim 21, wherein:
the armature cylinder comprises at least first, second, and third armature cylinder sleeves disposed an armature cylinder distance from one another, and the plurality of magnet coils are disposed from one another by a predetermined magnet distance equal to the armature cylinder distance.

26. The device of claim 25, wherein:
the armature cylinder distance and the predetermined distance between the first and second armature elements are equal.

27. The device of claim of claim 2, wherein:
the first armature cylinder sleeve functions as a magnetically-conductive element, and
the second and third armature cylinder sleeves function as magnetically-conductive yoke elements.

28. The device of claim 1, wherein:
the drive housing, the armature cylinder, the armature device, and the magnet coil are rotationally symmetric about a common longitudinal axis.

29. The device of claim 1, wherein:
a first end of the armature cylinder defines a bearing bore, and
a second end of the armature cylinder is disk-shaped and defines a central, stepped bore, thereby defining an armature space therein.

30. The device of claim 29, further comprising:
a guide cylinder defining a central bore therein, the guide cylinder being disposed within the stepped bore at the second end of the armature cylinder so that the guide cylinder is disposed within the armature space.

31. The device of claim 30, further comprising:
an armature carrier element to which the first and second armature elements are affixed;
a guide piece disposed within the drive housing adjacent to the first armature element, the guide piece defining a central bore therein,
wherein a first end of the armature carrier element is disposed in the central bore of the guide cylinder, and
wherein a second end of the armature carrier is disposed within the central bore of the guide piece; and
a pressure spring disposed between the second end of the armature cylinder and the armature carrier element, thereby biasing the armature carrier element against the guide piece when the magnetic coil is in a de-energized state.

32. The device of claim 31, wherein:
the pressure spring is disposed between the second end of the armature cylinder and the second armature element affixed to the armature carrier element.

33. The device of claim 31, wherein:
the pressure spring is disposed between the guide cylinder and the second armature element affixed to the armature carrier element.

34. The device of claim 6, wherein:
the armature carrier element is a cylindrical tube defining a central bore therein, and
a first end of the armature carrier element forms a valve seat.

35. The device of claim 34 further comprising:
a valve body disposed a predetermined valve distance, in the delivery direction, from the valve seat of the armature carrier element.

36. The device of claim 1, further comprising:
a coil frame comprising
a carrier base tube wall having a cylindrical shape, and first and second boundary piston lands extending radially from first and second ends of the carrier base tube wall,
wherein the carrier base tube wall is disposed adjacent to the armature cylinder.

37. The device of claim 1, further comprising:
a coil frame comprising
a carrier base tube wall having a cylindrical shape, and first and second boundary piston lands extending radially from first and second ends of the carrier base tube wall,
wherein the carrier base tube wall forms at least a part of the armature cylinder.

38. The device of claim 1, further comprising:
a coil frame comprising
a carrier base tube wall having a cylindrical shape, and first and second boundary piston lands extending radially from first and second ends of the carrier base tube wall,
wherein the carrier base tube wall comprises the armature cylinder.

39. The device of claim 1, wherein the drive housing comprises:
a cylindrical outer jacket wall, and
a base wall closing one end of the cylindrical outer jacket wall opposite to the delivery direction,
wherein the cylindrical outer jacket wall and the base wall define a drive housing inner space, and
wherein the base wall is stepped to define a base cavity adjacent to the drive housing inner space.

40. The device of claim 39, further comprising:
a guide piece disposed within the drive housing adjacent to the first armature element and the base cavity.

41. The device of claim 40, wherein:
the base cavity is disposed between the guide piece and the base wall.

42. The device of claim 1, wherein:
the armature cylinder comprises a base part extending radially outward therefrom at a distance from the base wall of the drive housing, and
the base part forms the bottom of the drive housing.

43. The device of claim 42, wherein:
the base part comprises a nozzle retaining cylinder protruding therefrom in the delivery direction.

44. The device of claim 43, wherein:
the base part defines a bore therethrough,
a cylinder guide extends from the bore through the base part to the first and second armature elements,
a first end of the cylinder guide is disposed within a blind hole bore within the bore,
the blind hole bore is delimited by a nozzle retaining cylinder, and
the blind hole bore has a larger cross-sectional area than that of the bore disposed through the base part.

45. The device of claim 44, further comprising:
at least a pressure space end element,
a carrier element for a stationary pressure valve, and
a spray nozzle element with a spring loaded injector needle,
wherein the pressure space end element, the carrier element, and the spray nozzle are disposed in the blind hole bore.

46. The device of claim 45, wherein:
the pressure space end element, the carrier element, and the spray nozzle are disposed axially adjacent one another in the delivery direction.

47. The device of claim 45, wherein:
the pressure space end element defines a pressure space bore therethrough, coaxial to the bore through the base part, in the delivery direction, the pressure space end element defines a tapered end to the pressure space bore, and the tapered end tapers in the delivery direction to an overflow bore to define an annular face.

48. The device of claim 47, wherein:

the pressure space bore and the bore through the base part define a pressure space adjacent to the overflow bore, and the overflow bore comprises a plurality of ribs disposed radially around its circumference, protruding into the pressure space, and defining a support for a valve body.

49. The device of claim 48, further comprising:

a pressure spring disposed in the pressure space with a first end disposed against the pressure space end element and a second end disposed against the valve body to press the valve body against the plurality of ribs when in a de-energized state.

50. The device of claim 45, wherein:

the carrier element is disposed axially adjacent to the pressure space end element, the carrier element includes a multiple stepped bore therethrough that initially tapers in the delivery direction and then enlarges to form a pressure retention chamber, and a stationary pressure valve is positioned within the pressure retention chamber.

51. The device of claim 50, wherein:

the stationary pressure valve maintains a predetermined minimum pressure in the pressure retention chamber, opening when the a pressure higher than the predetermined minimum pressure is exceeded.

52. The device of claim 42, further comprising:

a feed device disposed within a feed bore, wherein the feed bore is disposed radially through the base part from an outside wall to a pressure space within the base part, and wherein a feed direction is defined from the outside wall to the pressure space within the base part.

53. The device of claim 52, wherein the feed device comprises:

a feed nipple disposed within the feed bore adjacent the outside wall of the base part; and a return valve element disposed radially inward from the feed nipple.

54. The device of claim 53, wherein:

the return valve element prevents the free-flowing medium from flowing opposite to the feed direction.

55. The device of claim 53, wherein:

the feed bore is fluidly connected to an armature space within the drive housing via a first flood bore, which extends from the feed bore at a position radially outside of the return valve element to the armature space.

56. The device of claim 55, wherein:

the feed bore is connected to the armature space via the first flood bore and a cross bore that extends from the feed bore at the position radially outside of the valve element to one end of the first flood bore.

57. The device of claim 55, further comprising:

a drain nipple disposed within a drain bore, wherein the drain bore extends from the outside wall of the base part to a location adjacent to the pressure space.

58. The device of claim 57, wherein:

the drain bore is fluidly connected to the armature space via a second flood bore.

59. The device of claim 57, wherein:

the drain nipple is disposed at a position radially opposite to that of the feed nipple.

60. The device of claim 57, wherein:

the feed nipple, the first flood bore, the armature space, the second flood bore, and the drain nipple form a flow path that facilitates rinsing of the armature space with free-flowing medium.

61. The device of claim 57, wherein:

the feed nipple, the return valve, the ribs protruding into the pressure space, the armature space, the first and second flood bores, and the drain nipple form a flow path that facilitates rinsing of the pressure space with free-flowing medium when the armature carrier element is disposed a distance from the valve body.

62. The device of claim 57, wherein:

the pressure space is hydraulically separated from the armature space when the armature carrier element touches the valve body while moving in the delivery direction, thereby imparting kinetic energy from the armature element to the free-flowing medium in the pressure space in the form of a pressure impact.

63. The device of claim 1, wherein:

the free-flowing medium may be one selected from a group comprising dusty, granular, granulated, powdered, fluid, fluid mixed with solids, and sludges.

64. The device of claim 1, wherein:

the free-flowing medium is a fuel.

65. The of claim 6, wherein:

the armature carrier element is made of a magnetic conductor in at least one region adjacent to the first and second armature carrier elements.

66. The of claim 65, wherein:

the armature carrier element is made of stainless steel.

* * * * *

UNITED STATES PATENT AND TRADEMARK OFFICE
CERTIFICATE OF CORRECTION

PATENT NO. : 7,093,778 B1  
APPLICATION NO. : 10/049243  
DATED : August 22, 2006  
INVENTOR(S) : Wolfram Hellmich et al.

Page 1 of 1

It is certified that error appears in the above-identified patent and that said Letters Patent is hereby corrected as shown below:

Column 16

Line 45, replace "The of claim 6" with --The device of claim 6--;
Line 49, replace "The of claim 65" with --The device of claim 65--.

Signed and Sealed this

Twenty-third Day of September, 2008

JON W. DUDAS
*Director of the United States Patent and Trademark Office*